US009164002B2

(12) United States Patent
Anderson

(10) Patent No.: US 9,164,002 B2
(45) Date of Patent: Oct. 20, 2015

(54) INFRARED MONITORING SYSTEM AND METHOD

(76) Inventor: Lawrence E Anderson, Arlington, VA (US)

( * ) Notice: Subject to any disclaimer, the term of this patent is extended or adjusted under 35 U.S.C. 154(b) by 0 days.

(21) Appl. No.: 13/470,348

(22) Filed: May 13, 2012

(65) Prior Publication Data

US 2013/0301675 A1 Nov. 14, 2013

(51) Int. Cl.
*G01J 5/00* (2006.01)
*G01K 17/00* (2006.01)
*G01J 5/10* (2006.01)

(52) U.S. Cl.
CPC .. *G01K 17/00* (2013.01); *G01J 5/10* (2013.01)

(58) Field of Classification Search
CPC ............ G01K 17/00; G01K 13/00; G01J 5/10
USPC ................. 250/338.1, 339.01–339.09, 339.1, 250/339.11–339.15
See application file for complete search history.

(56) References Cited

U.S. PATENT DOCUMENTS

| | | | | | |
|---|---|---|---|---|---|
| 3,749,928 | A | * | 7/1973 | Jamet et al. ................... | 250/347 |
| 4,175,418 | A | * | 11/1979 | Steffen et al. ................. | 454/180 |
| 4,793,553 | A | * | 12/1988 | Berman ....................... | 236/91 R |
| 5,400,964 | A | * | 3/1995 | Freiberger .................. | 236/91 C |
| 5,971,597 | A | * | 10/1999 | Baldwin et al. ............... | 700/277 |
| 6,082,894 | A | * | 7/2000 | Batko et al. ................... | 374/142 |
| 2008/0159616 | A1 * | | 7/2008 | Fellinger ...................... | 382/141 |
| 2009/0210192 | A1 * | | 8/2009 | Askar .......................... | 702/136 |
| 2010/0163633 | A1 * | | 7/2010 | Barrett et al. ................ | 236/49.3 |
| 2010/0207951 | A1 * | | 8/2010 | Plaisted et al. ................ | 345/473 |
| 2010/0245103 | A1 * | | 9/2010 | Plaisted et al. ................ | 340/657 |
| 2011/0090077 | A1 * | | 4/2011 | Meyer et al. .................. | 340/521 |
| 2011/0113360 | A1 * | | 5/2011 | Johnson et al. ............... | 715/771 |
| 2011/0190952 | A1 * | | 8/2011 | Goldstein ..................... | 700/291 |
| 2011/0257926 | A1 * | | 10/2011 | Stubler et al. ................. | 702/136 |
| 2012/0065789 | A1 * | | 3/2012 | Scelzi et al. .................. | 700/291 |
| 2012/0307859 | A1 * | | 12/2012 | Gogolla ........................... | 374/1 |

OTHER PUBLICATIONS

Authors: G M Revel, E Sabbatini and M Arnesano, Title: Development and experimental evaluation of a thermography measurement system for real-time monitoring of comfort and heat rate exchange in the built environment.*
Authors: E. Grinzato a,* , V. Vavilov b, T. Kauppinen , Title: Quantitative infrared thermography in buildings, Date: Jun. 10, 1997, Publisher: Energy and Buildings 29 (1998)I-9.*
Author: Peter Brooks, Title: Testing Building Envelopes with Infrared Thermography; Delivering the "Big Picture", date: Jul. 2007, Publisher: RCI, Inc. (www.rci-online.org/interface/2007-07-brooks.pdf).*
Authors: John Snell and Spring, P.E., Title: Testing Building Envelope Systems sing Infrared Thermography, date: 2008, Publisher: The Snell Group / www.thesnellgroup.com.*

(Continued)

*Primary Examiner* — Mark R Gaworecki
*Assistant Examiner* — Taeho Jo

(57) ABSTRACT

A method and system for monitoring the flow of heat into and out of a building comprising at least one infrared detector adapted to be positioned on opposite sides of a building opening; at least one processor for processing data obtained from the at least one infrared detector; the at least one infrared detector operatively connected to the at least one processor; whereby the at least one infrared detector operates to detect heat transfer through the building opening for processing by the at least one processor, the at least one processor being operative to detect energy usage.

20 Claims, 15 Drawing Sheets

(56) References Cited

OTHER PUBLICATIONS

Author: G M Revel, E Sabbatini and M Arnesano, Title:Development and experimental evaluation of a thermography measurement system for real-time monitoring of comfort and heat rate exchange in the built environment, Date: 2012, Publisher:Meas. Sci. Technol, IOP Publishing Ltd.*

Characteristics and use of Infrared Detectors, Technical Information SD-2, Hamamatsu, Nov. 2004.

"Precision Fiber Cleavers," by OxfordFiber.com, Http://www.oxfordfiber.com/welcome/wel_main.html.

Wikipedia "Optical Fiber" pp. 1-8(Jul. 18, 2011) pp. 9-22 May 10, 2012.Http://en.wikipedia.org/wiki/Optical_fiber.

Wikipedia "Optical Fiber" pp. 9-22 May 10, 2012.Http://en.wikipedia.org/wiki/Optical_fiber.

Wikipedia "Optical Fiber" pp. 1-9 (Jul. 18, 2011) pp. 9-22 May 10, 2012.Http://en.wikipedia.org/wiki/Optical_fiber.

Cooper, J., "A Fast-response Pyroelectric Thermal Detector," J. Sci. Instrum. vol. 39, pp. 467-472 (1962).

* cited by examiner

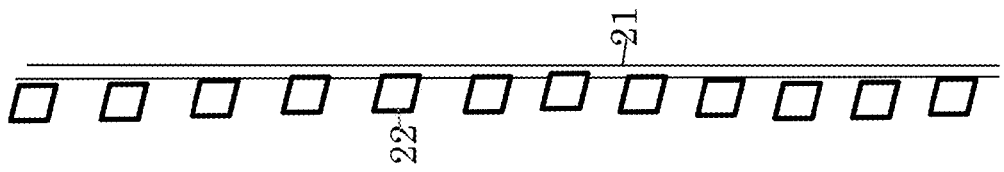
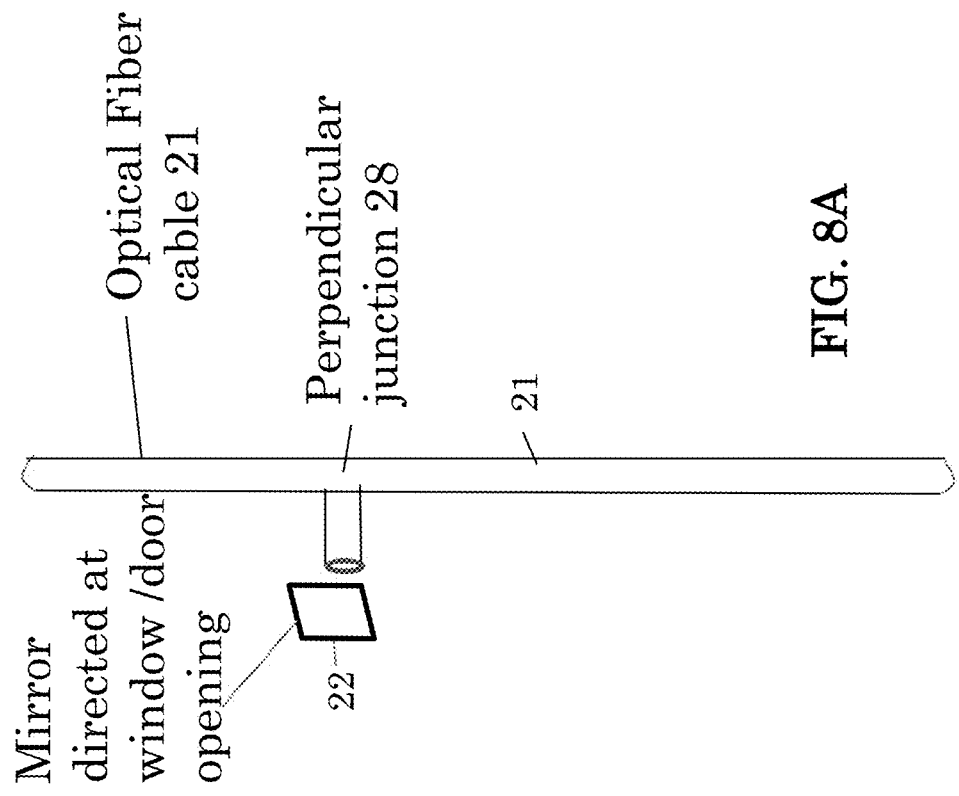
FIG. 8B
FIG. 8A

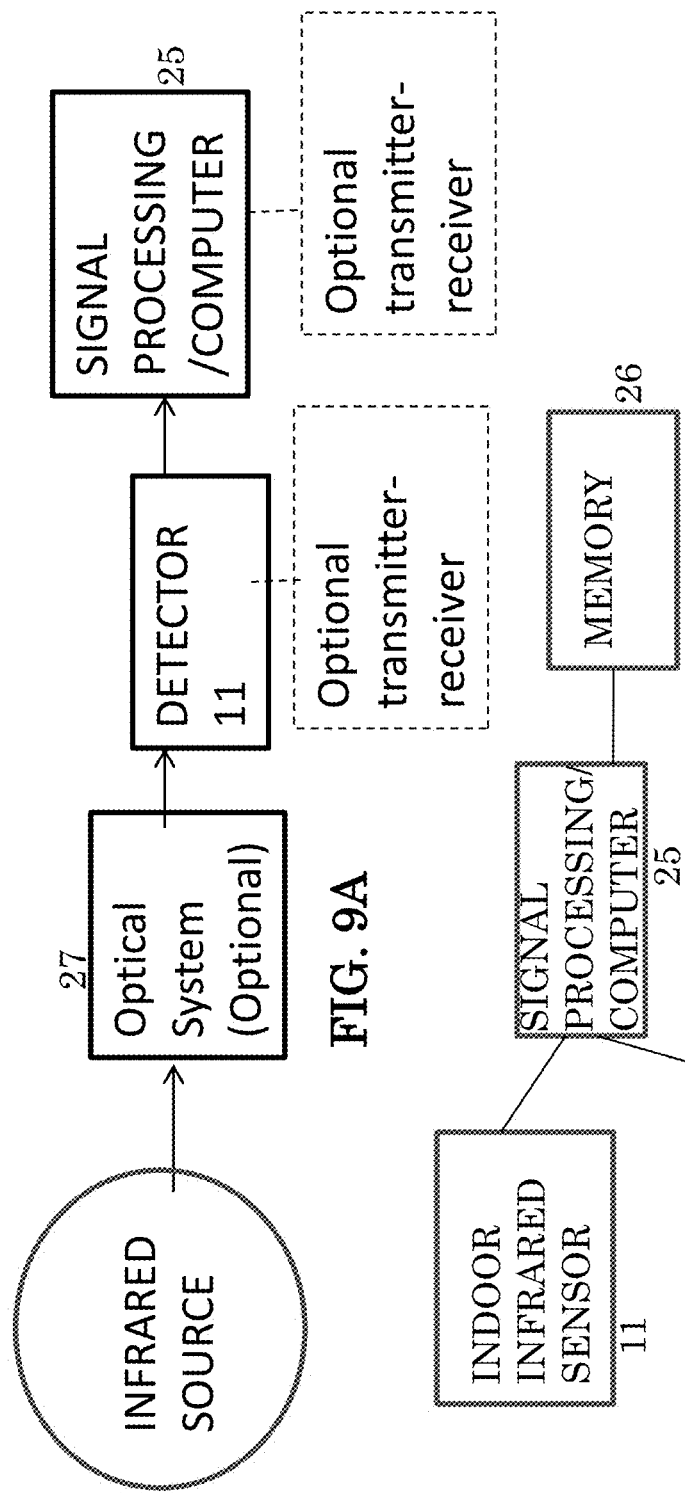

INFRARED MONITORING SYSTEM AND METHOD

BACKGROUND OF THE INVENTION

Although a great deal of attention is given to conservation of energy, persons in hotel rooms and apartment buildings who are not responsible for payment of their utilities, such as gas and electricity, have little or no economic incentive to close their doors and windows in inclimate weather. With respect to apartments, individual metering of electricity or gas may be impractical.

SUMMARY OF THE PRESENT INVENTION

A preferred embodiment infrared monitoring system for building openings comprises at least one infrared detector adapted to be positioned adjacent or in the proximity of a building opening; at least one processor for processing data obtained from the first and second infrared detectors; the at least one infrared detector operatively connected to the at least one processor; whereby the at least one infrared detector operates to detect heat transfer through the building opening for processing by the at least one processor, the at least one processor being operative to detect energy usage.

A method of monitoring heat loss through at least one building opening comprises positioning at least one infrared detector on opposite sides of a building opening; operating at least one processor for processing data, the at least one processor being operatively connected to the at least one infrared detector; whereby the at least one infrared detector operates to detect heat transfer through the building opening for processing by the at least one processor, the at least one processor being operative to detect energy usage.

The preferred method and preferred embodiment system may optionally comprise at least one temperature sensor; the at least one temperature sensor being operatively connected to the at least one processor; whereby when a predetermined temperature differential between temperatures inside and outside the building is sensed, the infrared monitoring system is activated.

The at least one building opening may be one of a window or door, and the at least one infrared detector may comprise one external infrared detector positioned external to the building and one internal infrared detector positioned internal in the building.

The preferred embodiment system and method may further comprise at least one temperature sensor adapted to be positioned external and/or internal to the building. For example, the at least one temperature sensor may sense a temperature differential of at least 20 degrees Fahrenheit before the at least one infrared detector is activated.

Optionally, the first detector may be operatively connected to a heat supply within the building; and the heat detector operatively connected to the at least one processor, whereby the external infrared detector is operative when the first detector detects the operation of the heat supply within the building.

Optionally, the at least one processor may operate to calculate and accumulate the duration and intensity of heat transfer in order to approximate energy loss through the building opening.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 8A is an enlarged schematic illustration of a fiber optical cable connection and reflecting mirror.

FIG. 8B is an enlarged schematic illustration of a fiber optical cable connection comprising a plurality of reflecting mirrors FIG. 9A is a schematic block diagram of a preferred embodiment overall system structure.

FIG. 9B is a schematic block diagram of a preferred embodiment overall system structure comprising two infrared detectors 11 and memory 26.

DETAILED DESCRIPTION OF PREFERRED EMBODIMENTS

Figure 1:
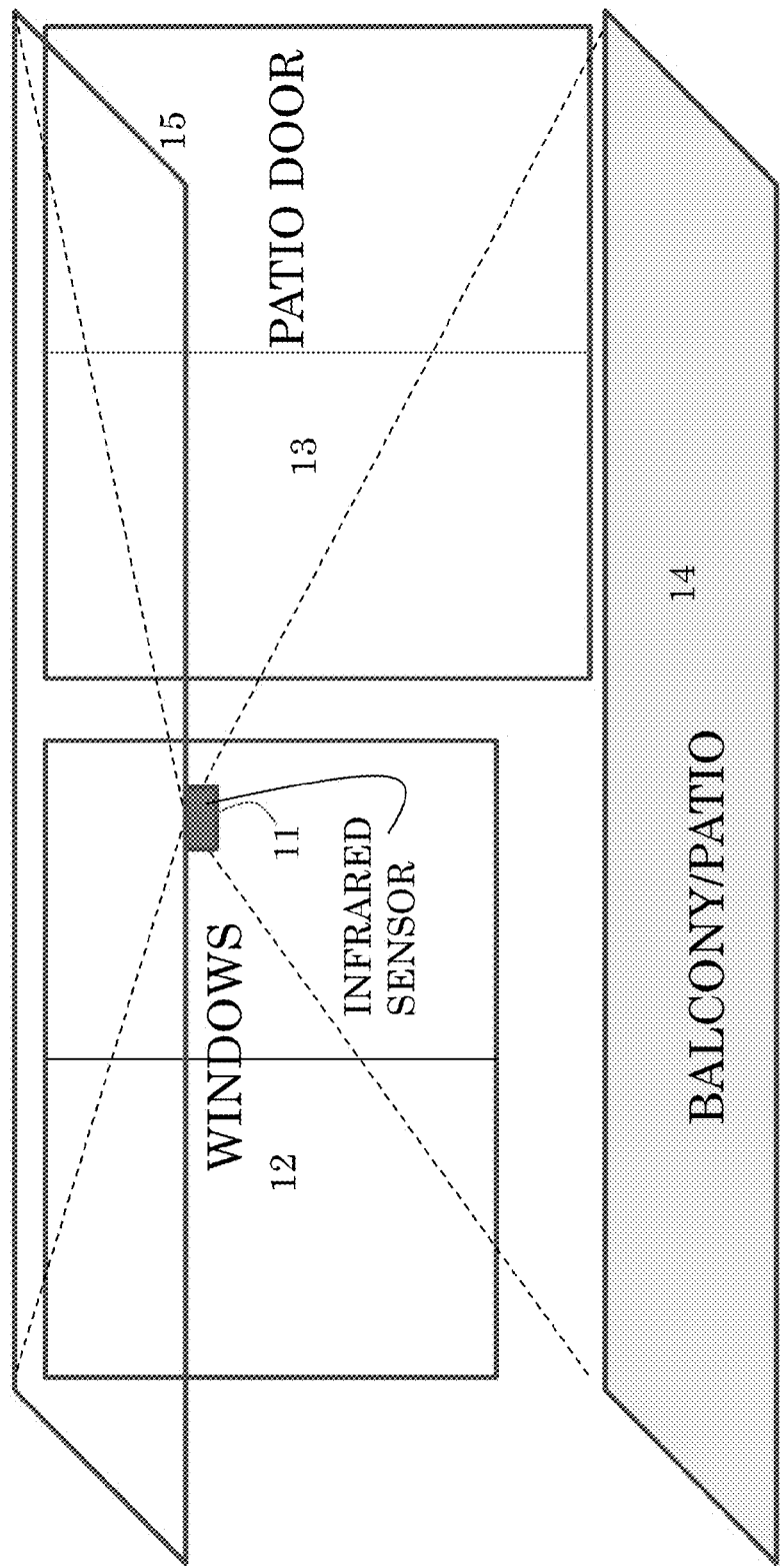
FIG. 1 is a schematic illustration of a preferred embodiment infrared monitoring system comprising a detector 11.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," "left" or right" may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Apartment owners on a common electric or heating system lose heat and cold (AC) through their outside windows and doors. Residents can leave there windows and doors open and release heat or cold through to the outside without disadvantage or cost to them. A thermal monitoring unit using infra red imaging would change this. While infrared sensing is known, the new idea is to use in conjunction with an apartment.

Conversely in the summer time, an infrared sensing device may be positioned on the inside of an apartment unit or building. If a window or door is opened, the heat will be sensed by the infrared sensor.

In addition, an infrared monitoring device also prevents theft in that it may be set to an alarm. If a thief enters the cool apartment in the summer time, the infrared detector will detect the opening, Likewise, positioned on the outside in the winter, if a thief enters, the infrared detector will detect the escape of heat and set off an alarm.

The Infrared spectra or window for Infrared emission transmitted by the atmosphere where absorption by $H_2O$, $Co_2$ and other elements takes place at specific wavelengths; absorption is less from 3 μm to 5 μm and from 8 μm to 12 μm.

Heating by gas burning is in the wavelength range of 1 to 20 μm. There are at least two types of infrared detectors: a thermal type with no wavelength dependence and a quantum type with wavelength dependence. Photo sensitivity is the output voltage (or output current) per watt of incident energy is
$R=S/PA$ [V/W] where S is signal output, P incident energy and A detector area. The output of the photodetector may be expressed by $I_{sc}=\eta qPA\lambda/(hc)$ Fiber optic cable such as silicon can be used. According to Wikipedia, Silica exhibits fairly good optical transmission over a wide range of wavelengths. In the near-infrared (near IR) portion of the spectrum, particularly around 1.5 μm, silica can have extremely low absorption and scattering losses of the order of 0.2 dB/km. A high transparency in the 1.4-μm region is achieved by maintaining a low concentration of hydroxyl groups (OH).

To converge or focus infrared radiation optical lenses made of materials such as quartz, CaF2, Ge, Silicon or polyethylene may be utilized. For a further description, see Technical Information SD-12 "Characteristics and Use of Infrared Detectors, Solid State Division, Hamamatsu.

FIG. 1 is a schematic illustration of a preferred embodiment infrared monitoring system comprising an infrared detector 11 mounted, for example, to the underside of an apartment balcony. The central placement of the detector provides for coverage of infrared rays being emitted through the doors 13 and/or windows 12, or in the cracks between the doors 13, windows 14 and housings or channels for the doors 13 and windows 12. For example, in the winter time, heat from the apartment inside may escape through cracks or openings in the door molding and or structure which can be observed and/or detected by infrared sensor 11.

Figure 2:
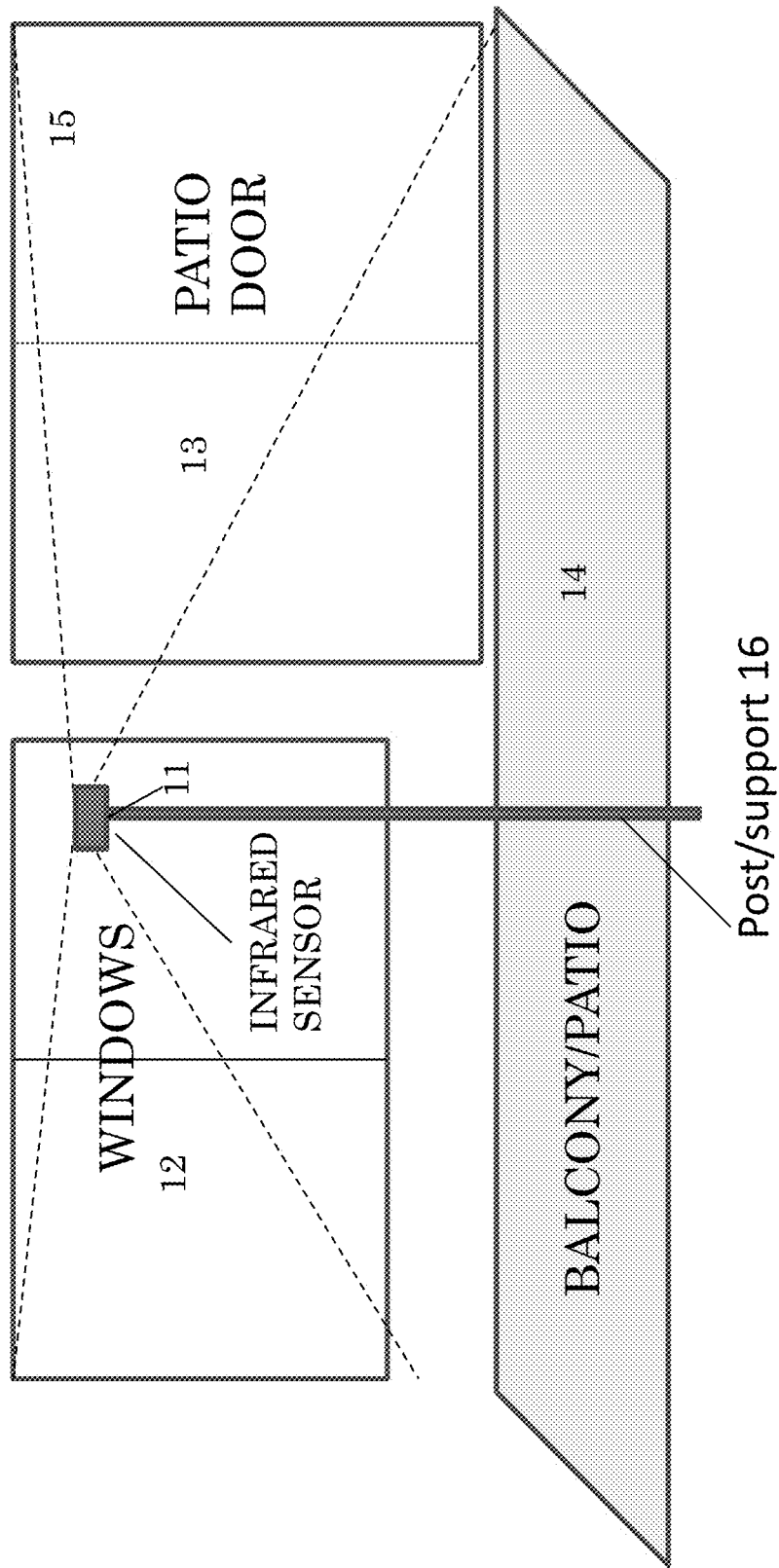
FIG. 2 is a schematic illustration of an alternate preferred embodiment infrared monitoring system comprising an overhead sensor 11 in an external environment mounted to a support 16.

FIG. 2 is a schematic illustration of an alternate preferred embodiment infrared monitoring system comprising an overhead sensor 11 in an external environment mounted to a support 16. The support may be a preexisting structure or provided for the positioning of the infrared sensor. The post may be of adjustable length for optimal positioning of sensor 11. The post may be removable so as to be positioned only at times when sensing takes place, such as during cold weather. In all of the embodiments in FIGS. 1-11, the sensor may be connected by radio transmission or may be wired.

Figure 3:
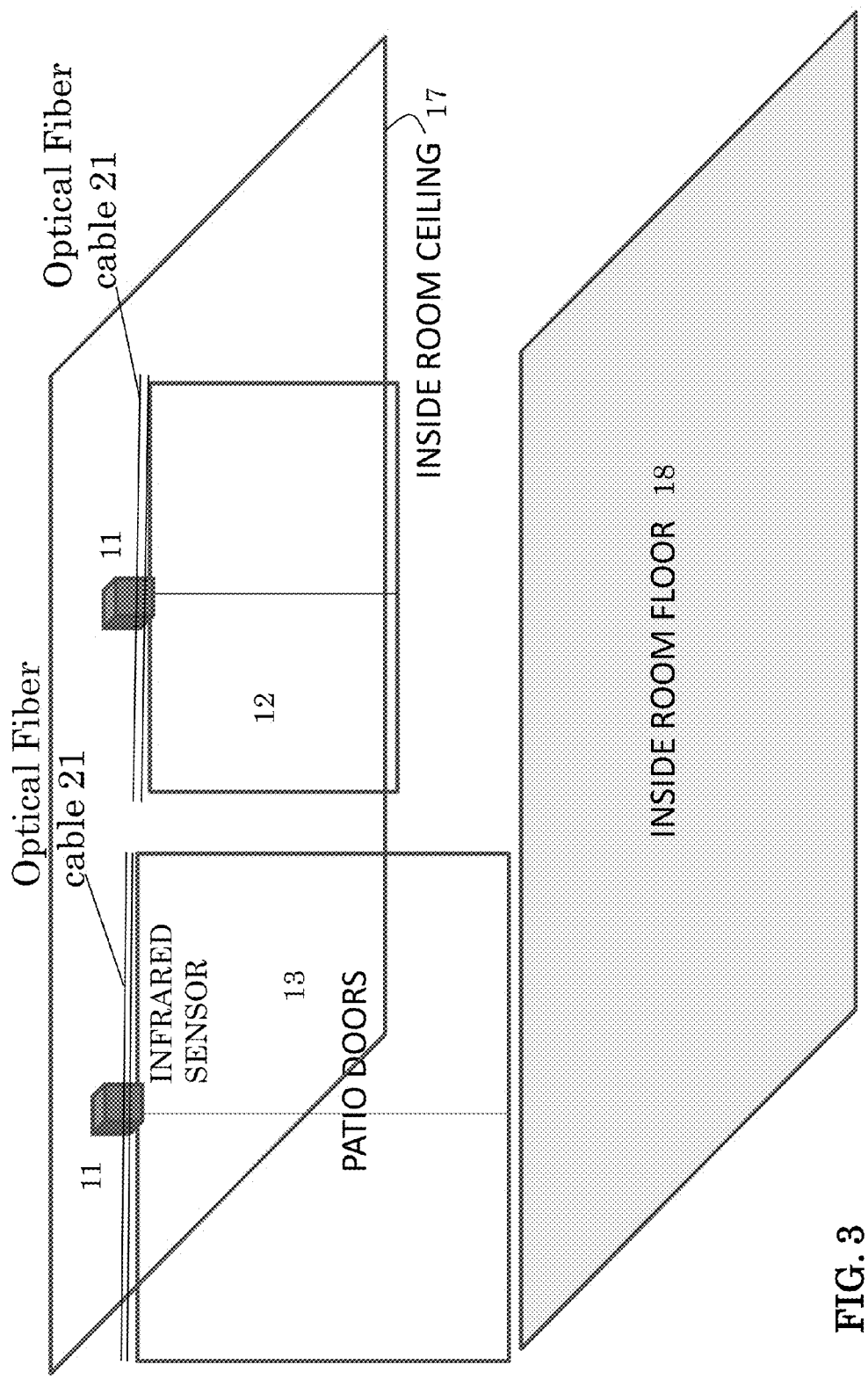
FIG. 3 is a schematic illustration of a preferred embodiment infrared monitoring system comprising an overhead sensor 11 in an internal environment and fiber optical cable.

FIG. 3 is a schematic illustration of a preferred embodiment infrared monitoring system comprising an overhead sensor 11 in an internal environment. As shown in FIG. 3, the sensor may be mounted above the windows 12 and/or doors 13 and positioned to monitor infrared emission through, for example, the windows 12, door 13 and or openings or cracks around the openings. The embodiment shown in FIG. 3 comprises optional fiber optic cable positioned along the borders of the doors 13 and windows 12. Infrared radiation may enter into the fiber optic cables 21 to thereby detect leakage and/or openings of the doors 13 and/or windows 12. The Optical fiber cables 21 may include mirror reflectors 22 for reflecting infrared radiation into the fiber optics and sensor 11. For example, in the summer time when the air conditioning is operational, infrared radiation could be detected through leakage and/or openings of doors 13 and/or windows 12.

Figure 4:
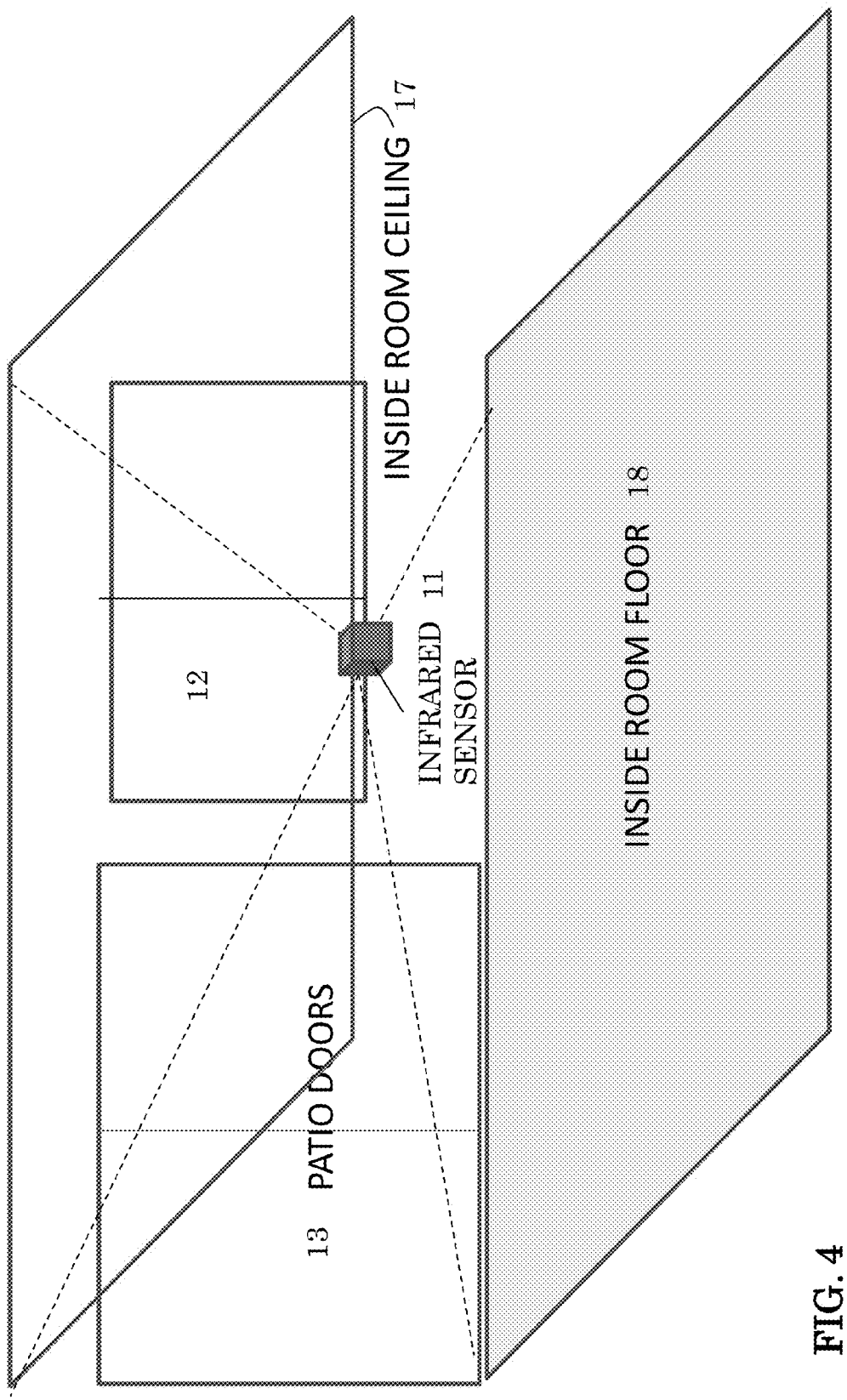
FIG. 4 is a schematic illustration of a preferred embodiment infrared monitoring system comprising an overhead sensor 11 in an internal environment mounted to a ceiling 17.

FIG. 4 is a schematic illustration of a preferred embodiment infrared monitoring system comprising an overhead sensor 11 in an internal environment mounted to a ceiling 17. As shown in FIG. 4, the sensor 11 may be removably mounted onto a ceiling 17 or wall and positioned to monitor infrared emission through, for example, the windows 12, door 13 and or openings or cracks around the openings. Infrared radiation may enter into sensor 11 to thereby detect leakage and/or openings of the doors 13 and/or windows 12. For example, in the summer time when the air conditioning is operational, infrared radiation could be detected through leakage and/or openings of doors 13 and/or windows 12.

Figure 5:
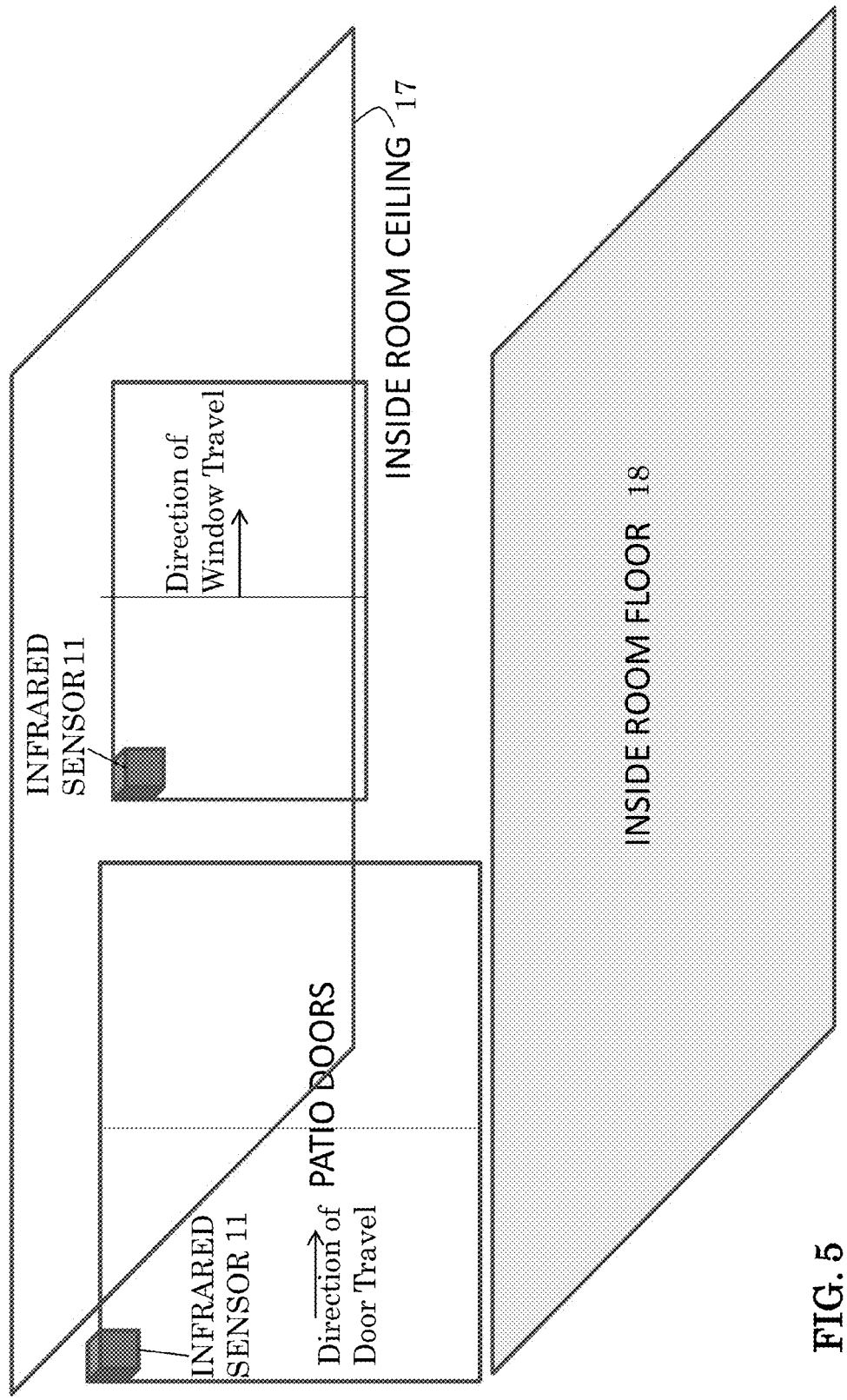
FIG. 5 is a schematic illustration of a preferred embodiment infrared monitoring system comprising infrared sensors 11 in an internal environment mounted adjacent to building openings 12, 13.

FIG. 5 is a schematic illustration of a preferred embodiment infrared monitoring system comprising infrared sensors 11 in an internal environment mounted adjacent to building openings 12, 13. Infrared radiation may enter into sensors 11 to thereby detect leakage and/or openings of the doors 13 and/or windows 12. For example, in the summer time when the air conditioning is operational, infrared radiation could be detected through leakage and/or opening of doors 13 and/or windows 12.

Figure 6:
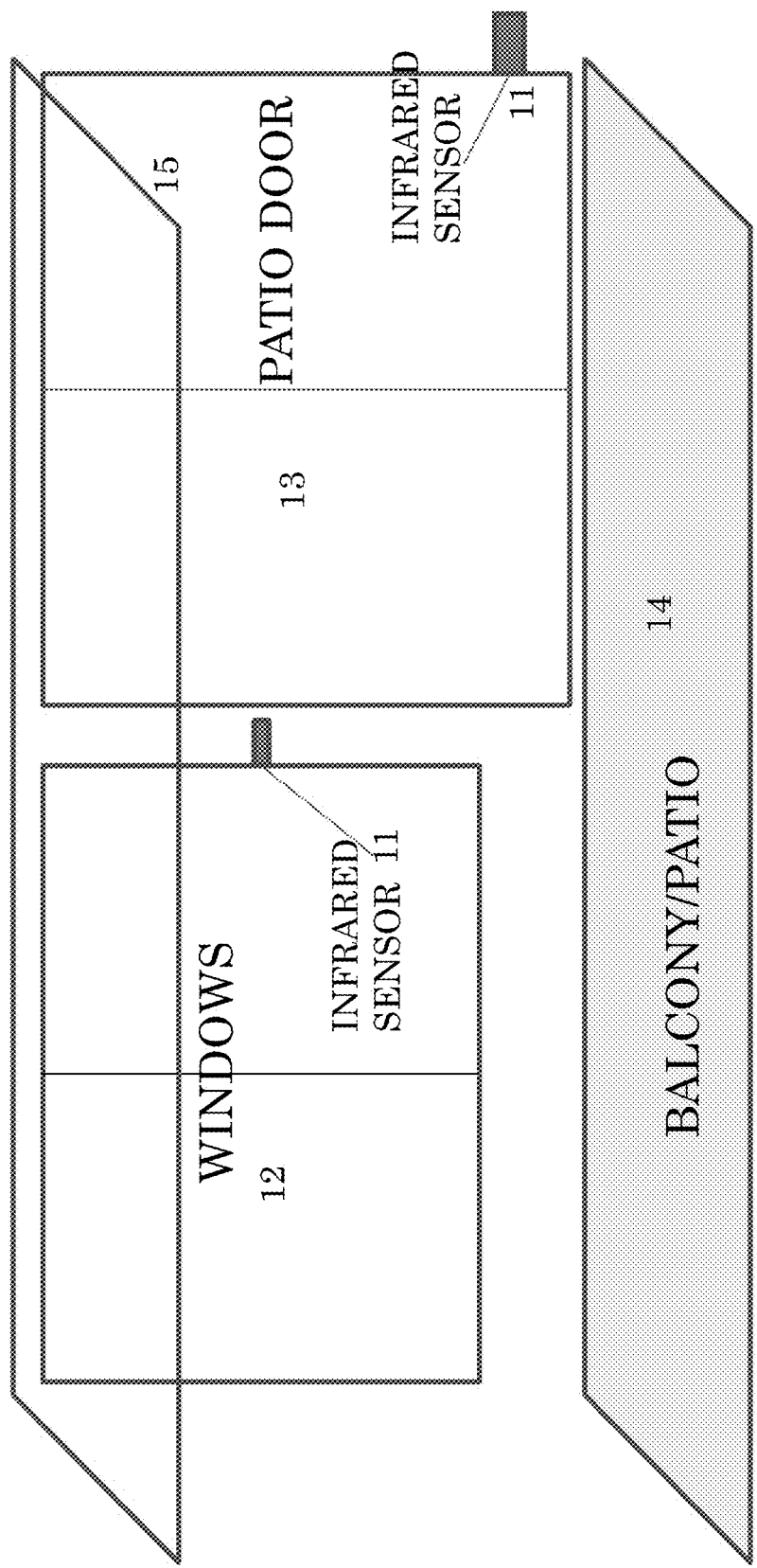
FIG. 6 is a schematic illustration of a preferred embodiment infrared monitoring system comprising infrared sensors 11 in an external environment mounted adjacent to building openings 12, 13.

FIG. 6 is a schematic illustration of a preferred embodiment infrared monitoring system comprising infrared sensors 11 in an external environment mounted adjacent to building openings 12, 13. The sensors may be strategically position to detect any opening of the windows 12 and/or doors 13 in the winter time so as to detect energy loss from the building. The sensors 11 may be removably positioned or hard wired and alarmed so that tenants of the apartment may not circumvent the detection. Any number of detectors may be used at any number of positions; the placement of detectors 11 in FIG. 6 is for example only.

Figure 7:
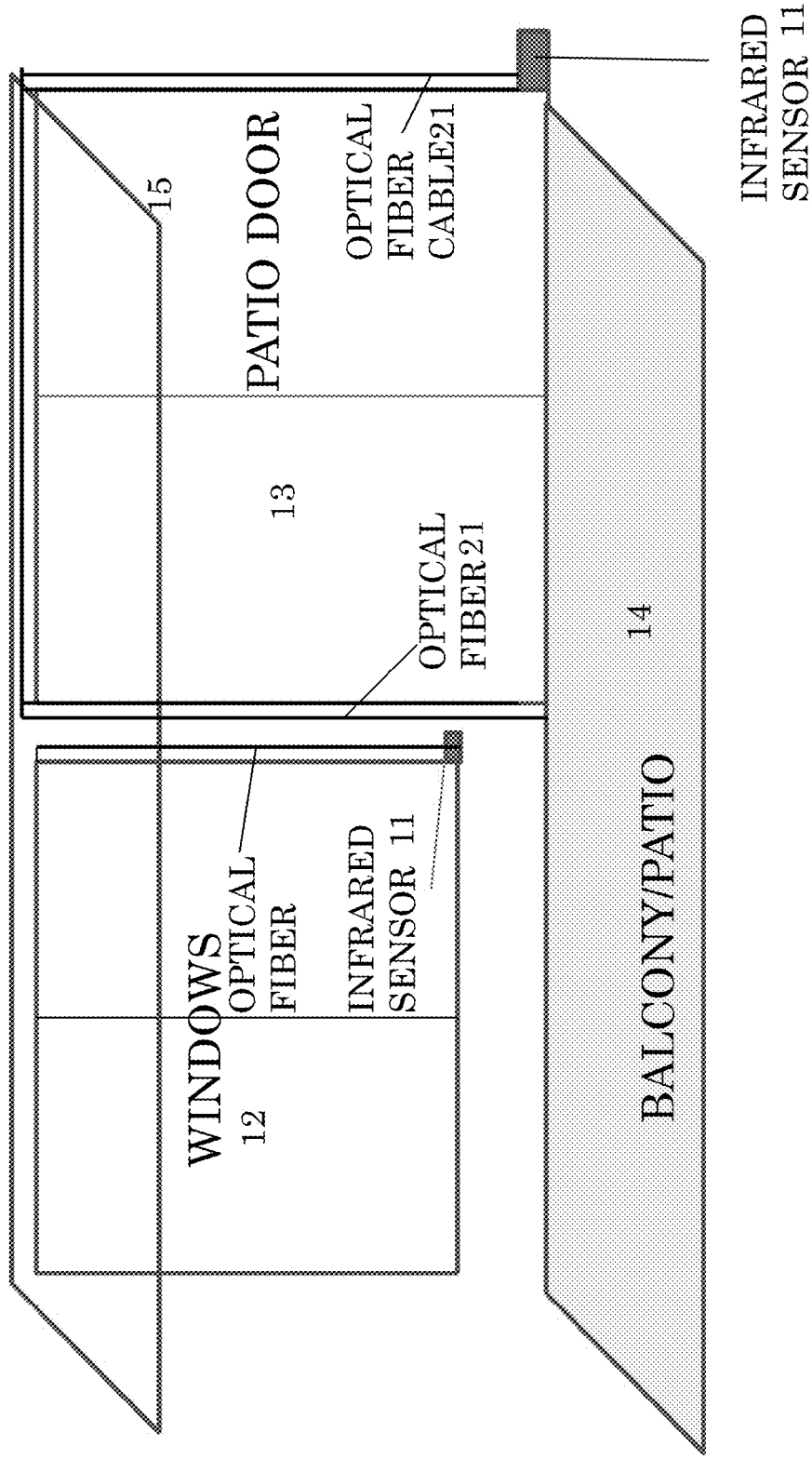
FIG. 7 is a schematic illustration of a preferred embodiment infrared monitoring system comprising infrared sensors 11 in an external environment connected to optical fiber cables 21 adjacent to building openings 12, 13.

FIG. 7 is a schematic illustration of a preferred embodiment infrared monitoring system comprising infrared sensors 11 in an external environment connected to optical fiber cables 21 adjacent to building openings 12, 13. The fiber optic cables may be positioned adjacent the door 13 and window 12 openings so as to not interfere with passage but positioned to monitor heat loss when the windows 12 and doors 13 are opened and/or when heat is lost though the door or window channels. The fiber optic cable may extend around the entire periphery or monitor intermittent locations. Mirrors 22 may be used to reflect radiation into the fiber optic cable as shown in FIG. 8.

FIG. 8A is an enlarged schematic illustration of a fiber optical cable 21, perpendicular junction connection and reflecting mirror 22. The perpendicular junction may be similar to the "square cleave" disclosed in the advertisement "Precision Fiber Cleavers," by OxfordFiber.com, hereby incorporated by reference. Infrared radiation is reflected by mirror or reflecting surface 22 into the fiber optic cable.

FIG. 8B is an enlarged schematic illustration of a fiber optical cable connection comprising a plurality of reflecting surfaces or mirrors 22 which may be, for example, positioned along the length of the fiber optic cable 21. Optionally, each mirror may be operatively associated with a square cleave to provide entrance of infrared radiation into the fiber optic cable.

FIG. 9A is a schematic block diagram of a preferred embodiment overall system structure. An optional optical system 27 may be used to focus the infrared radiation into the detector 11. The signal processor and/or computer 25 may comprise one or more processors or controllers. As used herein the terminology "processor" or "controller" may be a microprocessor, computer, programmable controller, programmable chip, multiprocessor, personal computer, CPU, coprocessor, central processor, or the like.

FIG. 9B is a schematic block diagram of a preferred embodiment overall system structure comprising two infrared detectors 11 and memory 26. The memory 26 may be operatively connected to a signal processor and/or computer 25 may comprise one or more processors or controllers.

Figure 10:
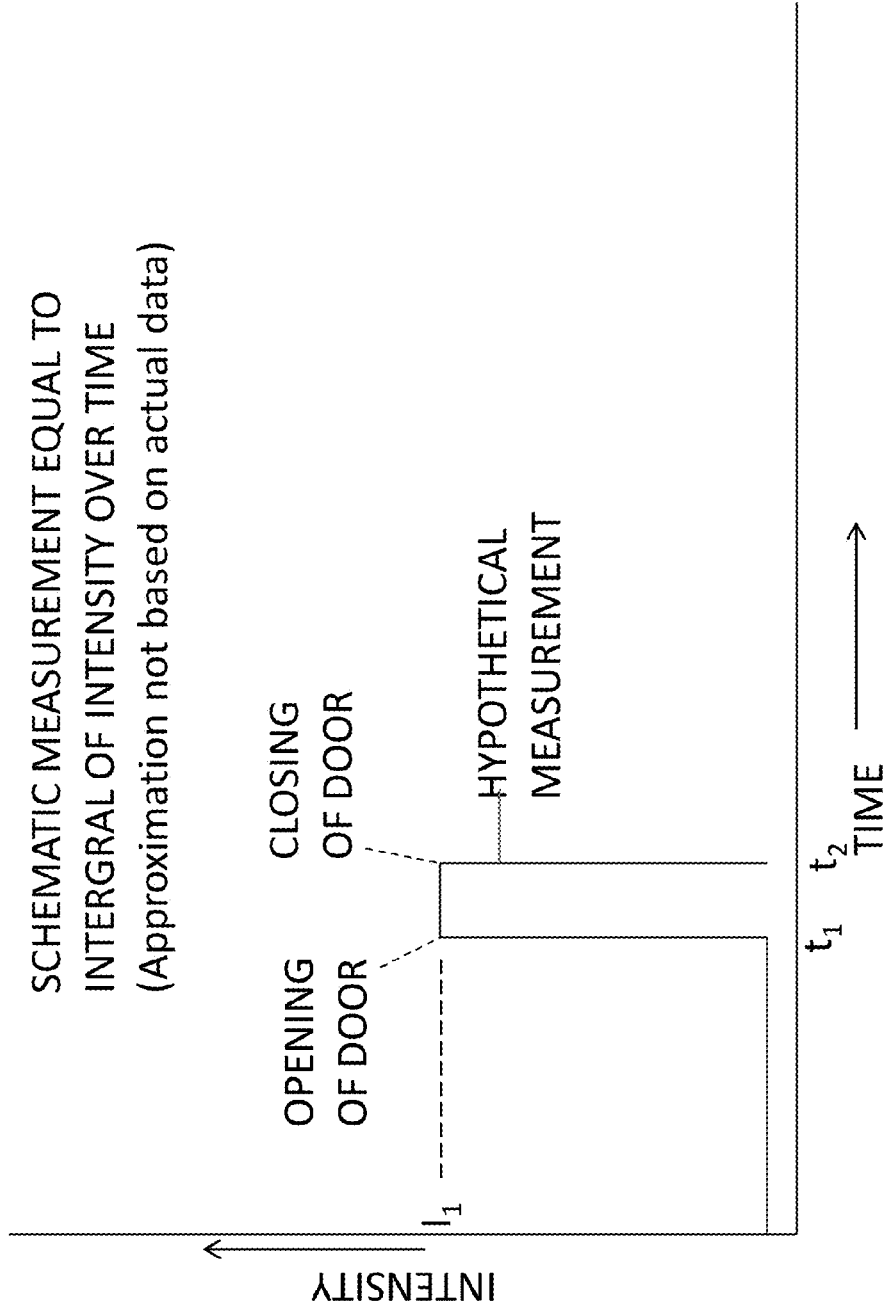
FIG. 10 is a depiction of a hypothetical graphical measurement in accordance with the principles of the present invention.

FIG. 10 is a depiction of a hypothetical graphical measurement in accordance with the principles of the present invention. Inasmuch as the system may be used to approximate energy loss from an apartment, office, store or other type of building structure, shown in FIG. 10 is a scenario where the detector 11 operates to detect the opening of a door at time $t_1$. At time $t_2$ the door is closed. The area under the $I_1$ intensity line and between $t_1$ and $t_2$ represents an approximation of energy loss which may be billed to the apartment dweller or occupier of the building, without the necessity of monitoring the electricity and/or gas usage.

Figure 11:
FIG. 11 is a flow chart of a preferred embodiment of the present invention for an interior application.

FIG. 11 is a flow chart of a preferred embodiment of the present invention for an interior application. Optionally, the system may be operational only when the temperature outside reaches a certain, predetermined temperature. For example, when the temperature reaches 80 to 90 degrees outside, the tenant will generally require air conditioning and the window 12 or door 13 may be opened or cracks around the windows 12 and doors 13 may allow infrared radiation to escape. Optionally, the detector may become operational when the air conditioning is turned on. Optionally, the detector 11 may be turned on and become operational at a threshold temperature differential. The system may include a temperature setting or temperature dial or selector so that the operator may select anyone of a variety of monitoring temperatures One sufficient predetermined intensity of infrared radiation is detected, a timer may be operated to record the duration of the energy loss. If the energy loss or intensity reaches a minimum, the detector enters a stand-by state; until the detector again detects infrared radiation above a predetermined threshold as depicted in FIG. 11.

Figure 12:
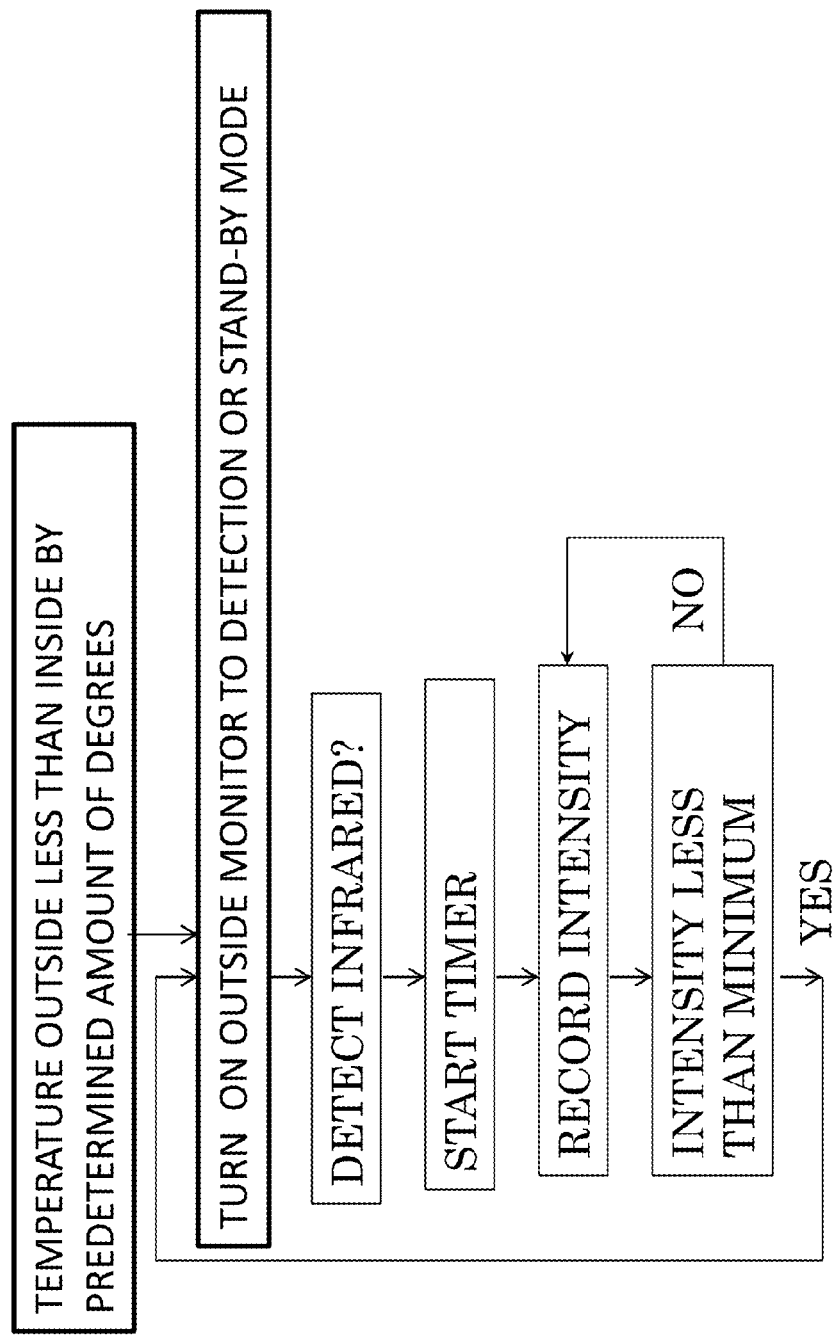
FIG. 12 is a flow chart of a preferred embodiment of the present invention for an exterior application.

FIG. 12 is a flow chart of a preferred embodiment of the present invention for an exterior application. Optionally, the system may be operational only when the temperature outside reaches a certain, predetermined temperature. For example, when the temperature reaches 30 to 40 degrees outside, the tenant will generally require heat and the window 12 or door 13 may be opened or cracks around the windows 12 and doors 13 may allow infrared radiation to escape. Optionally, the detector 11 may be turned on and become operational at a threshold temperature. The system may include a temperature setting or temperature dial or selector so that the operator may select anyone of a variety of monitoring temperatures One sufficient predetermined intensity of infrared radiation is detected, a timer may be operated to record the duration of the energy loss. If the energy loss or intensity reaches a minimum, the detector enters a stand-by state; until the detector again detects infrared radiation above a predetermined threshold as depicted in FIG. 12.

Figure 13:
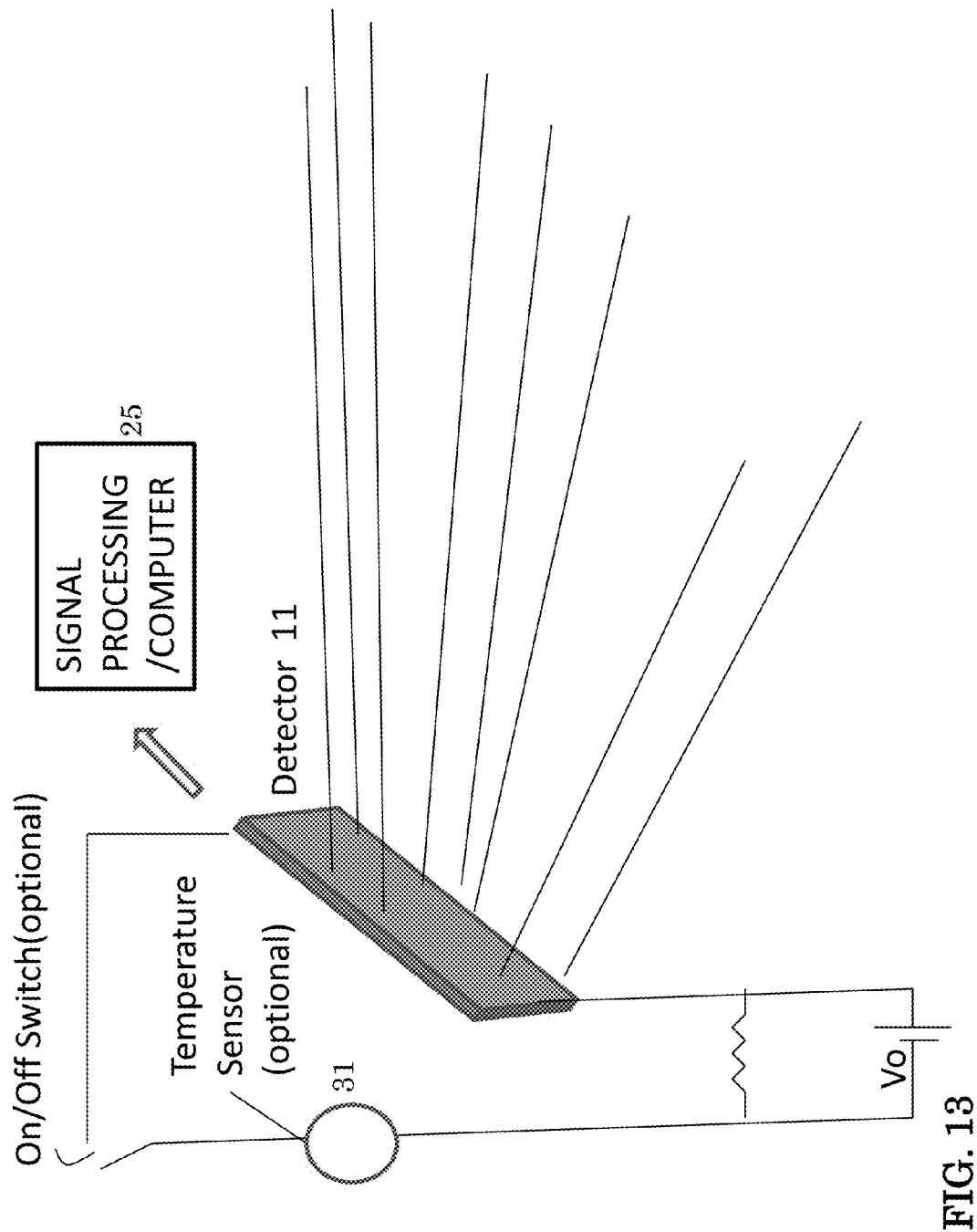
FIG. 13 is a circuit diagram of a sensor or detector 11 preferred embodiment of the present invention.

FIG. 13 is a circuit diagram of a sensor or detector 11 preferred embodiment of the present invention. The detector 11 may be connected to a voltage source Vo which may be a battery or conventional 110/120 volts. Optionally, the circuit may include a temperature sensor 31 and/or an on-off switch. The output of the detector is operationally connected to a controller or computer as depicted in FIG. 9A or 9B.

Figure 14:
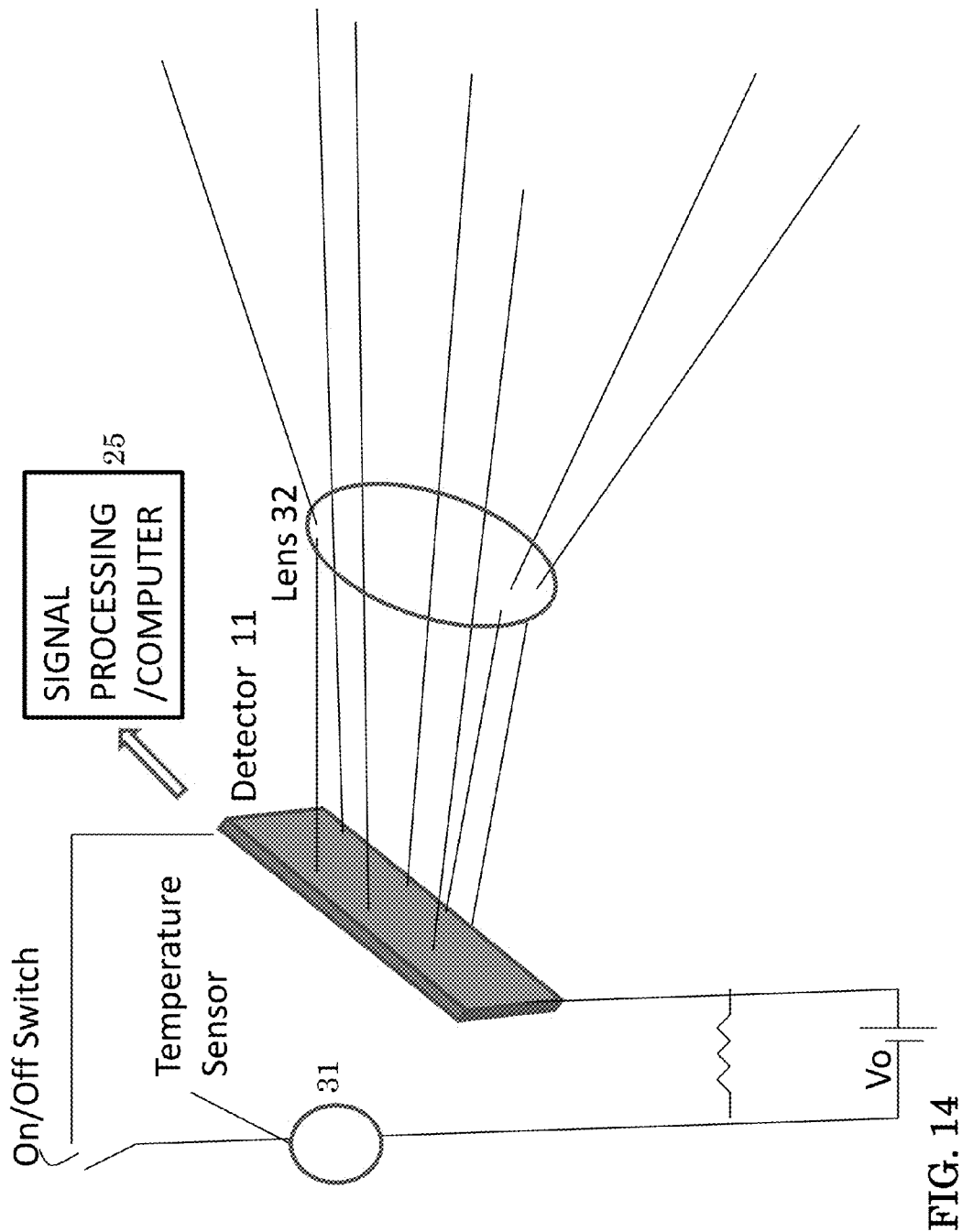
FIG. 14 is an alternate circuit diagram of a sensor or detector 11 preferred embodiment of the present invention comprising an optical system or lens 32.

FIG. 14 is an alternate circuit diagram of a sensor or detector 11 preferred embodiment of the present invention comprising an optical system or lens 32. The detector 11 may be connected to a voltage source Vo which may be a battery or conventional 110/120 volts. Optionally, the circuit may include a temperature sensor 31 and/or an on-off switch. The output of the detector is operationally connected to a controller or computer 25 as depicted in FIG. 9A or 9B.

Figure 15:
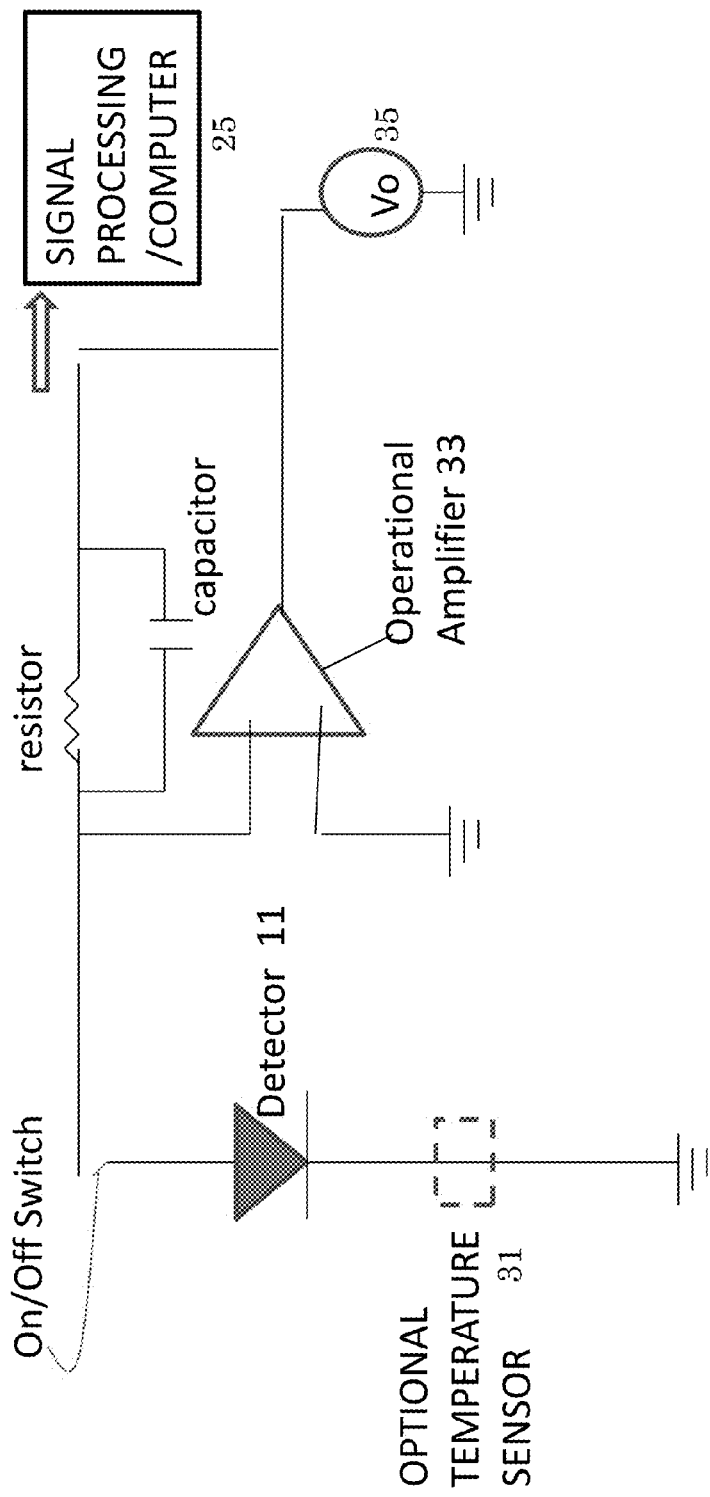
FIG. 15 is an alternate circuit diagram of a sensor or detector 11 preferred embodiment of the present invention comprising an operational amplifier 33.

FIG. 15 is an alternate circuit diagram of a sensor or detector 11 preferred embodiment of the present invention comprising an operational amplifier 33. The detector 11 may be connected to a voltage source Vo which may be a battery or conventional 110/120 volts. Optionally, the circuit may include a temperature sensor 31 and/or an on-off switch. The output of the detector is operationally connected to a controller or computer 25 as depicted in FIG. 9A or 9B. In the embodiments depicted in FIGS. 13-15, optionally, instead of a wired connection between the detector 11 and computer 25, each of the detector 11 and computer 25 may be operationally connected to a "transmitter-receiver" As used herein, the terminology "transmitter-receiver means an assembly or combination of assemblies which receive and transmit electromagnetic signals.

As used herein the terminology "processor" or "controller" as used herein may be a microprocessor, computer, programmable controller, programmable chip, multiprocessor, personal computer, CPU, coprocessor, central processor, or the like.

As used herein the terminology "external" means external to the building.

Embodiments of the present invention are described herein are schematic illustrations of idealized embodiments of the present invention. As such, variations from the shapes of the illustrations as a result, for example, of manufacturing techniques and/or tolerances, are to be expected. The embodiments of the present invention should not be construed as limited to the particular shapes of displays illustrated herein but are to include deviations in shapes that result, for example, from manufacturing.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An infrared monitoring system for monitoring the passage of heat to and from the interior of a building comprising at least one external infrared detector and at least one internal infrared detector adapted to be positioned on opposite sides of an external building wall comprising at least one of a window or door for monitoring of heat flow in and out of a building; at least one processor for processing data obtained from the at least one infrared detector; the at least one infrared detector operatively connected to the at least one processor; whereby the at least one infrared detector operates to detect heat transfer through the building wall for processing by the at least one processor, the at least one processor being operative to detect energy usage.

2. The system of claim 1 wherein a first infrared detector is positioned external to the building wall comprising one of a window or door and a second infrared detector is positioned internal to the building wall comprising one of a window or door.

3. The system of claim 2 further comprising a first detector operatively connected to a heat supply within the building; the heat detector operatively connected to the at least one processor, whereby the external infrared detector is operative when the first detector detects the operation of the heat supply within the building.

4. The system of claim 1 wherein the at least one infrared detector comprises one external infrared detector positioned external to the building and one internal infrared detector positioned internal in the building.

5. The system of claim 1 further comprising at least one temperature sensor positioned externally to the building operative to detect the temperatures outside of the building such that if temperature outside the building is greater than the temperature inside the building by a predetermined amount of degrees, the infrared detector inside the building is activated and the intensity is recorded.

6. The system of claim 5 wherein the at least one temperature sensor senses a temperature differential of at least 20 degrees Fahrenheit before the at least one infrared detector is activated.

7. The system of claim 1 further comprising at least one temperature sensor positioned external to the building and at least one temperature sensor positioned internal in the building, the at least one temperature sensor positioned external and internal to the building being operatively connected to the at least one processor; whereby when a predetermined temperature differential between temperatures inside and outside the building is sensed, the infrared monitoring system is activated.

8. The system of claim 1 wherein the at least one infrared detector is positioned within a range of approximately less than three feet of the building opening.

9. The system of claim 1 wherein the at least one processor operates to calculate and accumulate the duration and intensity of heat transfer in order to approximate energy loss through the building opening.

10. The system of claim 1 further comprising at least one temperature sensor; the at least one temperature sensor being operatively connected to the at least one processor; whereby when a predetermined temperature differential between temperatures inside and outside the building is sensed, the infrared monitoring system is activated.

11. A method of monitoring heat loss through at least one building opening comprising positioning at least one external infrared detector and at least one internal infrared detector on opposite sides of a building opening;
    operating at least one processor for processing data, the at least one processor being operatively connected to the at least one infrared detector;
    whereby the at least one infrared detector operates to detect heat transfer through the building opening for processing by the at least one processor, the at least one processor being operative to detect energy usage.

12. The method of claim 11 further comprising at least one temperature sensor; the at least one temperature sensor being operatively connected to the at least one processor;
    whereby when a predetermined temperature differential between temperatures inside and outside the building is sensed, the infrared monitoring system is activated.

13. The method of claim 11 wherein the at least one building opening comprises one of a window or door, and wherein the at least one external infrared detector detects infrared radiation from one side of the window or door and the at least one internal infrared detector detects radiation from the opposite side of the window or door.

14. The method of claim 11 wherein the at least one external infrared detector is activated when the temperature outside is less than the inside temperature by a predetermined amount of degrees.

15. The method of claim 11 further comprising at least one temperature sensor adapted to be positioned external and at least one temperature sensor adapted to be positioned internal to the building, the temperature sensors being operatively connected to the at least one processor; whereby when a predetermined temperature differential between temperatures inside and outside the building is sensed, the infrared monitoring system is activated.

16. The method claim 15 wherein the at least one temperature sensor senses a temperature differential of at least 20 degrees Fahrenheit before the at least one external infrared detector is activated.

17. The method of claim 11 further comprising a first detector operatively connected to a heat supply within the building; the first detector operatively connected to the at least one processor, whereby the at least one external infrared detector is operative when the first detector detects the operation of the heat supply within the building.

18. The method of claim 11 wherein the at least one external infrared detector is positioned within a range of approximately less than three feet of the building opening.

19. The method of claim 11 wherein the at least one processor operates to calculate and accumulate the duration and intensity of heat transfer in order to approximate energy loss through the building opening.

20. An infrared monitoring system comprising at least one infrared detector adapted to be positioned on opposite sides of an external building wall comprising at least one of a window or door for monitoring of heat flow in and out of a building; the at least one infrared detector comprising a first infrared detector positioned external to the building wall and a second infrared detector being positioned internal to the building wall;

a heat detector operatively connected to a heat supply within the building; the heat detector operatively connected to the at least one processor, the first infrared detector being operative when the heat detector detects the operation of the heat supply within the building;

at least one processor for processing data obtained from the at least one infrared detector; the at least one infrared detector operatively connected to the at least one processor;

whereby the at least one infrared detector operates to detect heat transfer through the building wall for processing by the at least one processor, the at least one processor being operative to detect energy usage.

\* \* \* \* \*